Oct. 14, 1958     H. E. METCALF     2,856,336
NEUTRONIC REACTOR CONTROL Filed June 4, 1945     7 Sheets-Sheet 1

FIG. 1.

Witnesses:
Henry W. Johnson
Estill E. Bell

Inventor:
Herbert E. Metcalf,
By: Robert A. [illegible]
Attorney.

Oct. 14, 1958 — H. E. METCALF — 2,856,336
NEUTRONIC REACTOR CONTROL
Filed June 4, 1945 — 7 Sheets-Sheet 2

Witnesses:
Henry H. Johnson
Estill E. Ezell

Inventor
Herbert E. Metcalf
By: Robert A. ————
Attorney

Oct. 14, 1958　　　H. E. METCALF　　　2,856,336
NEUTRONIC REACTOR CONTROL
Filed June 4, 1945　　　　　　　　　　7 Sheets-Sheet 3

Inventor:
Herbert E. Metcalf

Oct. 14, 1958 H. E. METCALF 2,856,336
NEUTRONIC REACTOR CONTROL
Filed June 4, 1945 7 Sheets-Sheet 4

Inventor:
Herbert E. Metcalf

United States Patent Office 2,856,336
Patented Oct. 14, 1958

2,856,336

NEUTRONIC REACTOR CONTROL

Herbert E. Metcalf, Chicago, Ill., assignor to the United States of America as represented by the United States Atomic Energy Commission Application June 4, 1945, Serial No. 597,474

4 Claims. (Cl. 204—154.2)

My invention relates to the general subject of nuclear fission and more particularly to means and methods for developing and controlling a neutronic reaction by nuclear fission of uranium or other fissionable material.

It is known that the isotope $U^{235}$ in natural uranium can be split or fissioned by bombardment with thermal neutrons, that is, neutrons in thermal equilibrium with the surrounding medium, to provide under certain conditions a self-sustaining neutronic reaction operating under high neutron densities. The fission neutrons produced by nuclear fission give rise to new fission neutrons in sufficiently large numbers to overcome the neutron losses in the system. Since the result of the fission of the uranium nucleus is the production of two lighter elements with great kinetic energy, plus approximately a statistical average of two neutrons for each fission along with beta and gamma radiation, new elements, as well as a large amount of power in the form of heat, can be made available in a self-sustaining system.

Most of the neutrons arising from the fission process are set free with the very high energy of above one million electron volts average and are therefore not in condition to be utilized efficiently to create new neutrons by thermal fission in $U^{235}$. The fast neutrons from fission, after they are created, must be slowed down to thermal energies by use of a neutron moderator before they are most effective to produce fresh fission by bombardment of additional $U^{235}$ atoms. It is necessary that the neutrons be slowed down without much absorption until they reach thermal energies and then mostly enter into the uranium rather than into any other element to provide a self-sustaining nuclear chain reaction. Deuterium in the form of heavy water, carbon in the form of graphite, or beryllium in the form of either oxide or metal may be used as a moderator or slowing medium without too great a loss of neutrons by capture thereof by the atoms of the moderator.

The fissionable material is distributed in the moderator in such a manner that the neutrons, when slowed to thermal energies, are in a position to enter the uranium or other fissionable material to produce new fission thereof. The combination of the fissionable material and the moderator is referred to as a neutronic reactor and the distribution of the fissionable material in the moderator is referred to as the geometry of the reactor. The fissionable material may be distributed throughout the moderator in a regular pattern and a reactor incorporating a solid moderator, such as graphite or beryllium, may be referred to as a lattice.

The ability of any reactor or lattice to remain self-sustaining by the release of neutrons from the uranium depends upon the number of new fast neutrons released by fission with respect to the original fast neutrons in the system. Thus, the ratio of the number of fast neutrons produced by the fissions in a generation to the original number of fast neutrons in a reactor of infinite size using specific materials may be called the reproduction or multiplication factor of the reactor and is denoted by the symbol K. By making K sufficiently greater than unity to create a net gain in neutrons and by making the reactor sufficiently large that this gain is not entirely lost by leakage from the exterior surface of the reactor, a self-sustaining neutronic reacting system can be built to produce new elements and fission products as well as power in the form of heat by nuclear fission of natural uranium by thermal neutrons. The heat is dissipated from the reactor either by natural radiation or by cooling means such as by circulation of a coolant through or around the reactor. The neutron reproduction ratio denoted by the symbol R (sometimes known as "effective" K) in a system of finite size differs from the factor K by the external leakage factor, and must be sufficiently greater than unity to permit the neutron density to rise exponentially in the reactor. Such rise will continue indefinitely if not controlled at a desired neutron density corresponding to a desired power output.

It is a principal object of my invention to provide a method and apparatus for controlling the speed of rise of the reaction in a neutronic reacting system and to limit the reaction to a safe level within the heat dissipating capabilities of the system.

In constructing a neutronic reactor, the fissionable material such as natural uranium containing the isotope $U^{235}$ may be distributed throughout the solid moderator such as carbon or beryllium to form a lattice structure as referred to above. For example, rods or other shaped uranium bodies are laid in recesses in a layer of graphite or beryllium and the reactor structure built up layer by layer arranging the rods or bodies in a regular array. If such construction is continued, an overall size is reached beyond which the inherent neutronic activity overcomes the natural neutron losses and the neutronic reaction becomes self-sustaining, and the neutron density continues to rise exponentially. The continuance of such a condition would be very dangerous because the density of the neutronic reaction increases exponentially with time and would soon exceed that corresponding to the heat dissipating capacity of the reactor.

It is a further object of my invention to provide a method of constructing a neutronic reactor and means preventing a nuclear reaction during the construction of the reactor. It is also an object of my invention to control the reaction effectively after construction of the reactor to an overall size exceeding that necessary to maintain a self-sustaining neutronic reaction.

During the neutronic reaction fission products including such elements as samarium are formed from the fissionable uranium isotope $U^{235}$. Samarium, as well as some other elements formed in this manner, has very high neutron absorption characteristics which may increase the total neutron absorption of the reactor with consequent decrease in the reproduction factor. However, the absorption of neutrons by the uranium isotope $U^{238}$ leads to the production of $94^{239}$, a new element often referred to as plutonium, symbol Pu. The plutonium is fissionable to an even greater degree than the isotope $U^{235}$ so that formation of plutonium tends to increase the reproduction factor notwithstanding decrease in the $U^{235}$ content of the uranium in the reactor. The operating time of a neutronic reactor of the type described is practically unlimited being measured in terms of hundreds of years and the present lapse of time has not been sufficient to determine accurately whether a decrease or increase in the reproduction factor will be the ultimate result. Thus, the end result after a long period of time may be either an increase or a decrease in the available K for sustaining the neutronic reaction. Consequently, it is desirable to build the reactor initially in such a manner as to allow future compensation for either an increase or decrease in neutronic activity with continued operation. This is particularly true inasmuch as it would be very difficult to reconstruct a neutronic reactor utilizing a solid moderator after operation was once initiated because of the radioactive nature of the fission products formed by the reaction. For example, after operation at high neutron density, the radioactivity of the materials in the reactor may be exceedingly high so that it would be impractical for operating personnel to add or remove one or more layers from the structure for the purpose of overcoming increased or decreased neutron losses through the formation of products causing variation in the reproduction factor.

It is thus a further object of my invention to provide a reactor which may be initially constructed in such a manner to allow for either an increase or decrease in neutronic activity with time, while simultaneously maintaining adequate control over the neutronic reaction whereby the reaction may be maintained at safe levels.

During the interchange of neutrons in a reactor comprising bodies of uranium of any size in a slowing medium, neutrons may be lost in four ways: by absorption in the uranium metal or compound, by absorption in the slowing material or moderator, by absorption in impurities present in the reactor constituents, and by leakage from the reactor. These losses will be considered in the order mentioned.

Natural uranium, particularly by reason of its $U^{238}$ content, has an especially strong absorbing power for neutrons when they have been slowed down to a moderate energy of approximately five electron volts, this amount of energy being termed a resonance energy. Other, but not so significant, resonance energies also cause or result in absorption. The absorption in uranium at these energies is termed the uranium resonance absorption or capture. It is caused by the isotope $U^{238}$ and does not result in fission but leads to the creation of the relatively stable nucleus $94^{239}$, referred to hereinafter as plutonium, symbol Pu. It is not to be confused with absorption or capture of neutrons by impurities, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. Volume resonance absorption is due to the fact that some neutrons make collisions inside the uranium body and may thus arrive at resonance energies therein. After successfully reaching thermal velocities, about 40 percent of the neutrons are also subject to capture by $U^{238}$ without fission, leading to the production of $94^{239}$. Irrespective of whether the neutron resonance absorption in $U^{238}$ is on the surface or in the volume of the uranium body, $94^{239}$ is produced by the resonance absorption according to the following process:

[6 m. e. v. of γ rays not necessary all of one frequency.]

It is possible by proper physical arrangement of the materials to reduce substantially uranium resonance absorption. By the use of light elements as described above for slowing materials, fewer collisions are required to slow the neutrons to thermal energies with large increments of energy loss between collisions, thus decreasing the probability of a neutron being at a resonance energy as it enters a uranium atom. During the slowing process, however, neutrons are diffusing through the moderator over random paths and distances so that the uranium is not only exposed to thermal neutrons but also to neutrons of energies varying between the energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium will reduce surface absorption, and any such reduction in surface absorption will release neutrons to enter directly into the chain reaction.

For a given ratio of slowing material to uranium, surface resonance absorption losses of neutrons in the uranium can be substantially reduced by a large factor from the losses occurring in a mixture of fine uranium particles and a slowing medium when the uranium is aggregated into substantial masses in which the mean spatial diameter is at least 1 centimeter for natural uranium metal and when the mean spatial diameter of the bodies is at least 2.4 centimeters for natural uranium oxide ($UO_2$) in graphite. An important gain is thus made in the number of neutrons made directly available for the chain reaction. A similar gain is made when the uranium has more than the natural content of fissionable material such as when enriched with plutonium. Consequently, the uranium is placed in the reactor in the form of spaced uranium masses or bodies of substantial size, preferably either of metal, oxide, carbide, or combinations thereof. The uranium bodies can be in the form of layers, rods, or cylinders, cubes or spheres, or approximate shapes, dispersed throughout the graphite, preferably in some geometric pattern. Optimum conditions are obtained with natural uranium by using metal spheres.

Following initiation of the reaction, the increased loss of neutrons, such as by the formation of fission products highly absorbent to neutrons, may be compensated by varying the volume to surface ratio of the uranium bodies assuming a non-optimum volume to surface ratio was initially used in the construction. Thus, the reactor may be built to substantially critical size and the reaction controlled by variation of the volume to surface ratio. However, the uranium bodies may be inaccessible for removal and replacement in a new geometry. In addition, such a control lacks precision and is cumbersome and erratic in operation. Such variation of this ratio is also difficult to provide in practice because of the high radio activities of the fission products in the uranium bodies.

It is thus a further object of my invention to provide a method and means for controlling a neutronic reactor that is positive, precise, and reliable in action and that may be effected without exposure of personnel to high radio activities.

The thermal neutrons are also subject to capture by the moderator. While carbon and beryllium have very small absorption characteristics for thermal neutrons, an appreciable fraction of thermal neutrons (about 10 percent of the neutrons present in the reactor under usual conditions with graphite) is lost by capture in the slowing material during diffusion therethrough. It is therefore desirable to have the neutrons reach thermal energy promptly and promptly enter the uranium.

In addition to the above-mentioned losses, which are inherently a part of the neutronic reaction process, impurities present in both the moderator and the uranium add a very important neutron loss factor in the chain. The effectiveness of various elements as neutron absorbers varies tremendously. Certain elements such as boron, cadmium, samarium, gadolinium, and some others, if present even in a few parts per million, could very likely prevent a self-sustaining chain reaction from taking place. It is highly important, therefore, to remove as far as possible all impurities capturing neutrons to the detriment of the chain reaction from both the slowing material and the uranium. If these impurities are present in too great quantity, the self-sustaining neutronic reaction cannot be attained. The permissible amounts of impurities will vary for each specific geometry, depending upon such considerations as the form in which the uranium is used—that is, whether natural or enriched, whether as metal or as oxide. The type of moderator used—for example, whether graphite or beryllium—also influences the effect of impurities, as do the weight ratios between the uranium and the moderator. Elements such as oxygen may be present and, as previously suggested, the uranium may be in the form of oxide, such as $UO_2$ or $U_3O_8$, or carbide, but the metal is preferred. Nitrogen may be present in fairly large amounts, and its effect on the chain reaction is such that the neutron reproduction ratio of the system may be changed by changes in atmospheric pressure. The effect may be eliminated by enclosing or evacuating the reactor if desired.

The effect of impurities on the optimum reproduction factor K may be evaluated conveniently by means of certain constants known as "danger coefficients" which are assigned to the various elements. These danger coefficients for the impurities are each multiplied by the percent by weight of the uranium in the reactor of each corresponding impurity, and the total sum of these products gives a value known as the total danger sum. This total danger sum is subtracted from the reproduction factor K as calculated for pure materials and for the specific geometry under consideration.

The danger coefficients are defined in terms of the ratio of the weight of impurity per unit mass of uranium and are based on the cross section for absorption of thermal neutrons of the various elements. These values may be obtained from physics textbooks on the subject and the danger coefficient computed by the formula $$\frac{\sigma_i}{\sigma_u} \cdot \frac{A_u}{A_i}$$

wherein $\sigma_i$ represents the cross section for the impurity and $\sigma_u$ the cross section for the uranium, $A_i$ the atomic weight of the impurity and $A_u$ the atomic weight for uranium. If the impurities are in the carbon or beryllium moderator, they are computed as their ratio of the weight of the uranium of the system.

As a specific example, if the materials of the system under consideration have .0001 by weight of H, Co, and Ag, and the danger coefficients for these elements are 12, 13, and 17, respectively, the total danger sum in K units for such an analysis would be:

$.0001 \times 12 + .0001 \times 13 + .0001 \times 17 = .0042$ reduction in K

This would be a rather unimportant reduction in the reproduction factor K unless the reproduction factor for a given system, without considering impurities, is very nearly unity. If, on the other hand, the impurities in the uranum are similar amounts of Li, Co, and Rh, having danger coefficients of 320, 13, and 42, respectively, the total danger sum would be:

$.0320 + .0013 + .0042 = .0375$ reduction in K

This latter reduction in the reproduction factor K for a given reactor would be very serious and might well reduce the reproduction factor below unity for certain geometries so as to make it impossible to effect a self-sustaining neutronic reaction with natural uranium and graphite, but might still be permissible when using enriched uranium in a system having a high K factor. The examples given will also illustrate how small amounts of impurities, if built up in the system from fission elements, can change the value of K and thus change the operating conditions of the reactor.

It is often desirable to subject various materials to high neutron densities for investigation of their neutron absorption or other characteristics. However, certain reactors proposed heretofore have been incapable of maintaining a neutronic reaction in the presence of even small quantities of some materials. Thus, a quantity of samarium or gadolinium as small as one gram introduced as the center of the reactor may prevent initiation of the neutronic reaction.

It is therefore a further object of my invention to provide a neutronic reactor into which relatively large quantities of foreign materials and substances may be introduced without the danger of the introduced materials rendering the reactor inoperative. It is a still further object to provide a reactor wherein the neutronic reaction may be initiated in the presence of relatively large quantities of foreign materials introduced within the reactor without sacrifice of control over the neutronic reaction.

It has been proposed to utilize the high absorbing action of some elements as a variable neutron absorber to control the reaction in accordance with the number of neutrons absorbed. By introducing neutron absorbing elements in the form of rods or sheets into the interior of the reactor, preferably in the moderator between the separated uranium masses, the neutronic reproduction ratio of the reactor can be changed in accordance with the amount of the absorbing material exposed to the neutrons in the reactor. While such a control is effective in limiting the reaction within safe neutron densities, adequate provision is not made for changes in reproduction factor of a solid moderator reactor with prolonged operation, the control being dependent entirely upon the number of neutrons absorbed from the reaction.

Thus, it is a further object of my invention to provide a solid moderator reactor wherein the control is substantially independent of the number of neutrons absorbed by the reactor controls, proportionate neutron absorption being substantially constant for all degrees of reactor control and almost exactly constant for small values of reactor control.

When the uranium and the moderator are of such purity and the uranium is so aggregated that fewer neutrons are parasitically absorbed than are gained by fission, the uranium will support a neutronic chain reaction and thereby provide an exponential rise in neutron density if the overall size of the reactor is sufficiently large to overcome the loss of neutrons escaping from the reactor. Thus, the overall size of the reactor is important.

The overall size of the reactor will vary, depending upon the K factor. If the reproduction factor K is greater than unity, the number of neutrons present will increase exponentially and indefinitely, provided the reactor structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-maintaining. For each value for the reproduction factor K greater than unity, there is thus a minimum overall size of the reactor known as the critical size, above which the rate of loss of neutrons by diffusion to the walls of the structure and leakage away from the structure is less than the rate of production of neutrons within the reactor, thus making the neutronic chain reaction self-sustaining. The rate of diffusion of neutrons away from a large reactor, in which they are being created, through the exterior surface thereof may be treated by mathematical analysis when the value of K is known, as the ratio of the exterior surface to the volume becomes less as the reactor is enlarged.

In the case of a spherical structure employing uranium bodies of any shape or size imbedded in a moderator such as graphite, the following formula gives the critical overall radius:

Critical sphere R ft., $K-1 = 7.4/R^2$

For a parallelepiped structure rather than spherical, the critical size can be computed from the formula $$K - 1 = 7.4\left(\frac{1}{a^2} + \frac{1}{b^2} + \frac{1}{c^2}\right)$$

where $a$, $b$, and $c$ are the lengths of the sides in feet,

The critical size for a cylindrical structure, irrespective of the shape of the uranium bodies, is given by the formula:

Cylinder height $h$ ft.
Radius $R$ ft.

$$K - 1 = \frac{7.4}{h^2} + \frac{4.1}{R^2}$$

The above formulae determine the critical size of the reactor and this size must be exceeded slightly to initiate the neutronic reaction. Consequently, it has been proposed to insert neutron absorbing material in the form of rods or sheets in the reactor during construction thereof and to partially remove the absorbing material, after completion, to slightly over critical size, to initiate the reaction. Any major increase in the reactor size over critical size produces a condition, when using such variable neutron absorption control, that may be exceedingly dangerous inasmuch as a small decrease in neutron absorption may cause such a rapid exponential rise in neutron density that it is impossible to maintain the rise within safe limits.

It is thus a further object of my invention to provide a neutronic reactor of a size considerably greater than critical size to allow for variation in the reproduction ratio thereof during prolonged operation that may be controlled with minimum danger of exceeding the permissible neutron density.

The above objects and other objects, features, and advantages of my invention will become apparent upon consideration of the following description of a system embodying my invention, when read in view of the accompanying drawings, which illustrate a neutronic reacting system wherein my invention may be utilized.

It will be understood that such criteria for the production of a neutronic chain reaction as the exact nature and purity of the materials employed, dimensions, spacings, cooling systems and other specifications for making a neutronic reactor self-sustaining, are not the invention of the present inventor, such criteria for operativeness being well known in the art, as exemplified by the copending application of Fermi and Szilard, Serial No. 568,904, filed December 19, 1944, now Patent No. 2,708,656, among others.

As a self-sustaining chain reaction in a solid moderator such as carbon or beryllium is not possible with natural uranium without aggregation of the uranium, I prefer to illustrate my invention by description of a simple, conductively cooled self-sustaining neutronic reacting system, in which the reactor portion is parallelepiped in shape, and in which natural uranium metal bodies, imbedded in high quality graphite, are utilized. The effect of impurities in the carbon is substantially the same as in the uranium since the neutrons diffuse freely in both materials.

Figure 1:
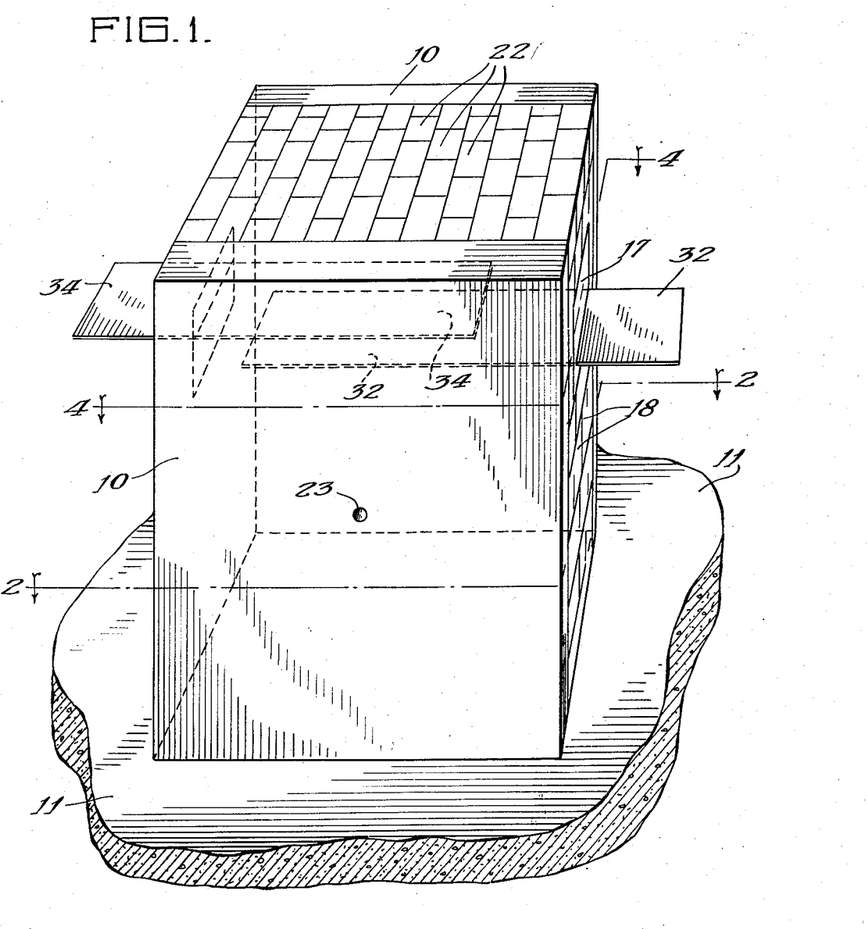
Fig. 1 is a diagrammatic perspective view of a neutronic reactor completely enclosed in a concrete shield.
Figure 2:
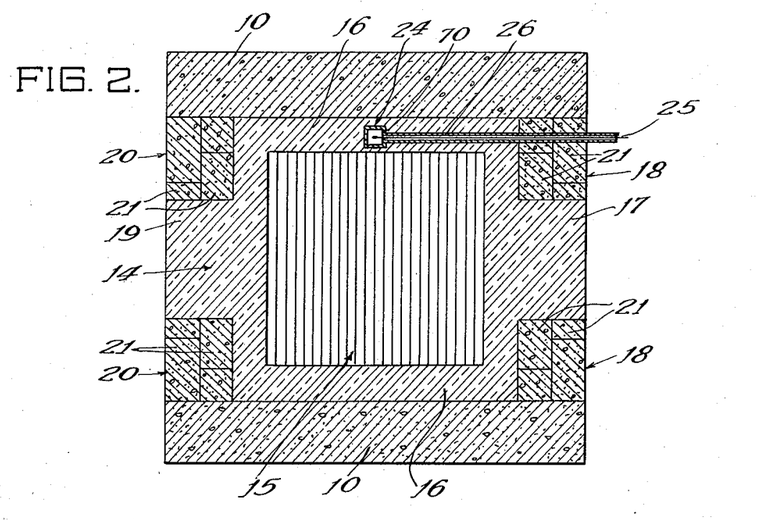
Fig. 2 is a plan view in cross-section of the structure shown in Fig. 1 taken along the line 2—2.

Referring first to Figs. 1 and 2 illustrating the completed structure, side walls 10 are erected on a heavy foundation 11, both preferably of poured concrete about 5 feet thick, leaving a vault space 14 inside walls 10 in which is built up, as will be explained later, a neutronic reactor 15 (Fig. 2) surrounded by a graphite reflector 16. The reflector is built with a graphite projection 17 that extends to a plane flush with the outer surface of front wall 18 and with an oppositely disposed graphite projection 19 that extends to a plane flush with the outer surface of rear wall 20. The walls are also 5 feet thick, formed of concrete bricks 21. The top of the structure is closed with covering bricks 22, also of concrete and 5 feet thick.

The side walls 10 are pierced to provide a horizontal channel 23 extending to the center of the reactor 15 near the central portion thereof. The channel 23 may be used to introduce various materials within the reactor, and as a channel through which both fast and slow neutrons and gamma rays may escape to the outside of the reactor for use in irradiation tests and studies made outside the reactor shield. When not in use the channel 23 may be plugged with a graphite rod (not shown) extending to the center of the reactor.

Within the reflector 16 and closely adjacent the reactor 15 is positioned an ionization chamber 24, connected to the exterior by wire line 25 lying within a shield conduit 26. The ionization chamber is useful for determining neutron density during operation, as described later in greater detail.

Figure 3:
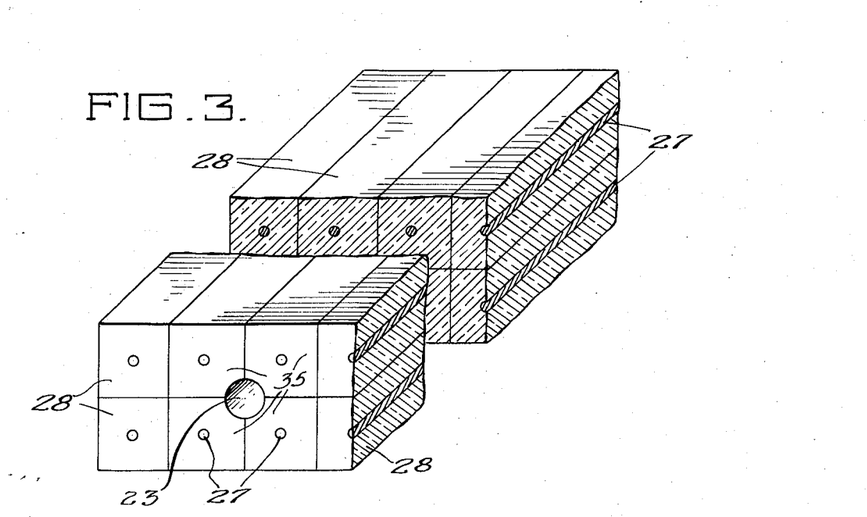
Fig. 3 is an enlarged fragmentary detail sectional view through a portion of the graphite and uranium structure in a neutronic reactor.

The reactor 15 comprises uranium and a solid moderator such as graphite or beryllium. As shown in Fig. 3, the reactor may comprise uranium rods 27 enclosed in rectangular graphite blocks 28 preferably of square cross-section. These blocks with the uranium are referred to as live graphite. The blocks 28 in one particular structure, capable of maintaining a self-sustaining neutronic reaction, are 4⅜ inches by 4⅜ inches by 50 inches, having been planed by woodworking machinery to have smooth rectangular sides. The graphite blocks are drilled and reamed and the uranium rods slipped therein with a snug fit to provide good heat conduction between the uranium and the graphite. I have also shown in Fig. 3 the relation of the channel 23 to the rods 27 and graphite blocks 28. This channel extends at least to the horizontal center of the reactor 15.

The reactor 15 is preferably of rectangular parallelepiped shape and is built, as later described, in layers, one supported on another. As a necessary step in following my invention, I build the complete reactor 15 to a size exceeding that corresponding to critical size. The plan cross-section of the reactor 15 may be square as shown in the drawings, the height of the reactor being greater than the dimension of the other sides. I so design the reactor 15 that a greater or active portion 30 thereof (Fig. 5) is just less than critical size, and another or inactive portion 31 is considerably less than critical size. The total volume of the active and inactive portions 30 and 31 is greater than (>) critical size but less than (<) twice critical size. The boundary between the active and inactive portions is defined by a movable control plate 32 extending through the projection 17 toward and preferably movable into the projection 19. I also provide a second movable control plate 34 in a position above the control plate 32 such that it extends from the opposite direction to that of control plate 32 and through the projection 19 toward and preferably movable into the projection 17.

The control plates 32 and 34 are of cadmium sheet or of other material having high neutron absorption characteristics. The plates have a minimum thickness of ⅛ inch although they may be made about one inch in thickness for purposes of rigidity. Alternatively thin cadmium plates may be backed with a steel sheet or other rigid member for purposes of support. The plates 32 and 34 preferably can be extended at least two-thirds across the width of the reactor. The plates may be artificially cooled such as by provision of water circulating channels in a backing plate. Such cooling is unnecessary in a reactor operating at low neutron density levels, such as when the reactor is cooled by natural heat radiation therefrom.

Figure 4:
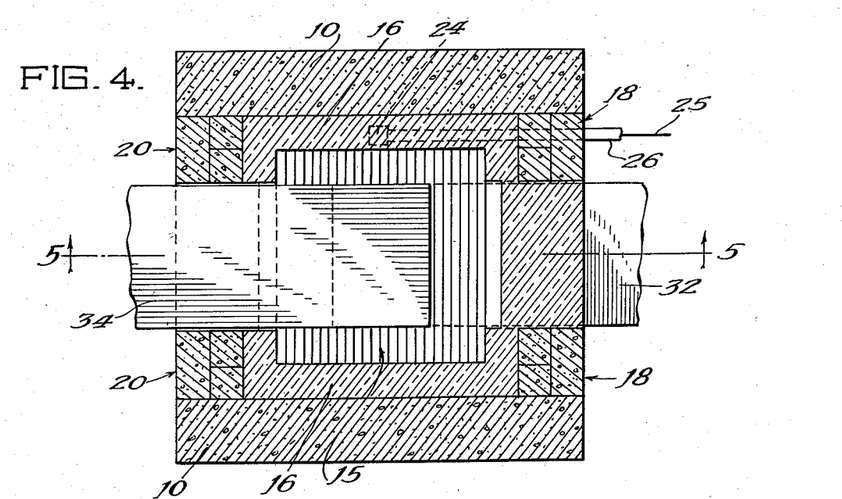
Fig. 4 is a plan view partially in cross-section of the enclosed reactor taken along the line 4—4 of Fig. 1.
Figure 5:
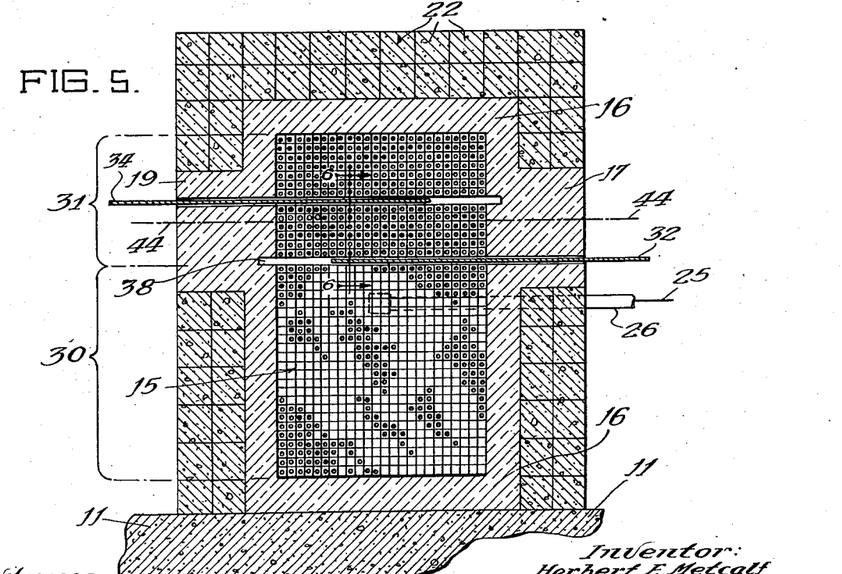
Fig. 5 is cross-sectional view of the structure in Fig. 1 taken on the line 5—5 of Fig. 4.

Referring particularly to Figs. 4 and 5, the reactor comprising the graphite blocks 28 filled with the uranium rods 27 are arranged in layers, the spacing of the rods from one another being dependent upon the particular cross-section size chosen for the graphite blocks. In the particular structure referred to above that I describe to explain the advantages accruing from my invention, I provide a reactor incorporating in the active portion thereof, 576 uranium rods and graphite blocks, each rod having a total length of 16.75 feet. The uranium rods may, of course, be of several sections laid end to end within the graphite blocks, the blocks having a density of 1.65 gm./cm.² I arrange these blocks in 24 layers of 24 graphite blocks in each layer resulting in a cubical active portion 30 slightly less than critical size, measuring approximately 16.75 feet on a side. Surmounting the active portion 30, I provide a total of 312 uranium rods enclosed in similar 8⅜ inch rectangular graphite blocks or a total of 13 rows of 24 each. The total height of the structure thus built up, including space between the active portion 30 and inactive portion 31 for the control plate 32, and the space in the inactive portion 31 for the control plate 34, is approximately 26 feet.

The number of rows of uranium filled graphite blocks between the control plates 32 and 34 may vary depending upon the degree of control desired for a given movement of the control plates. For example, if the control plates are locked together such as by an external yoke and moved together such that while one is moving inwardly the other is moving outwardly of the reactor, a given movement will provide a change in size of active portion dependent upon the number of uranium rods and graphite blocks between the control plates.

For uranium rods of substantially pure uranium having a boron content of less than 0.5 part per million and having a diameter of 3.4 centimeters spaced 8⅜ inches apart in a square lattice by high quality graphite, the reproduction factor K is approximately 1.074. The critical size of a neutronic reactor may be computed for a cubical structure with this value of K to determine the approximate desired size for the active portion 30 of the reactor using the above formula relevant to a rectangular parallelepiped. A cubical reactor for this value of K is 17.35 feet on a side. Since, in accordance with my invention, it is necessary to provide the portion of the reactor under the control plate 32 smaller than critical size, the active portion 30 is made cubical such as 16.75 feet on a side. For this structure the reproduction ratio R is approximately 0.995 so that it is impossible to initiate a self-sustaining neutronic reaction in the active portion alone. However, in accordance with my invention, the reaction may be initiated by supplying neutrons to the active portion 30 from the inactive portion 31 of the reactor by effectively adding part of the inactive portion to the active portion. A further advantage of my invention resides in the fact that I provide compensation for reduction in the reproduction factor of the reactor during the operating life thereof. For example, if it be assumed that a one percent reduction in the reproduction factor may occur during prolonged operation, the size of the inactive portion may be predetermined so that upon any reduction in the reproduction factor during operation the reactor may still be made self-sustaining by relative outward movement of the control plates, thereby effectively increasing the active portion 30 while decreasing the inactive portion 31.

Assuming the same lattice structure is used for the inactive portion of the reactor, and a possible reduction of one percent in the K factor during operation, the height of the inactive portion superimposed upon the active portion may be predetermined from the above formula for a rectangular parallelepiped structure. Under such conditions the height of the inactive portion is 9 feet, comprising 13 rows stacked vertically over the active portion for a total of 312 live graphite blocks.

The reactor 15 is preferably completely surrounded by the graphite reflector 16 for the purpose of conserving neutrons for the neutronic reaction. Thus neutrons escaping from the reactor enter the graphite reflector, are slowed by impact with the graphite atoms, the probability of their returning to the reactor being greater than in the absence of the graphite reflector due to random changes of direction on impact. The value of the reproduction factor used in computing the volume of the active portion 30 of the reactor 15 is based on the use of a graphite reflector 20 inches in thickness completely surrounding the reactor. The volue of the cubical active portion 30 is computed on the basis of equal neutron loss from all surfaces of the cube.

The actual construction of the reactor 15 and reflector 16 is started by placing on the foundation 10 within the vault space 14 several layers of plain graphite blocks, referred to as dead graphite, to form the portion of the reflector underlying the reactor. This portion is made approximately 25 inches in thickness corresponding to 3 rows of solid 8¾ inch square cross-section graphite blocks. Twenty-four drilled and uranium filled graphite blocks are then laid side by side over the center portion of the dead graphite to form the first layer of the reactor, filling the edges between the centralized layer and the sidewalls 10 with dead graphite to start the side portions of the reflector. The blocks of both dead and live graphite are closely packed without cement to eliminate air spaces therebetween as far as possible. Because of the block type of construction of both the reactor and reflector the structure incorporating these parts is sometimes termed a pile. The construction is continued until in approximately the fifteenth and sixteenth layer, four graphite blocks 35 (Fig. 3) having their corners cut away are laid to provide the channel 23 extending to the horizontal center of the reactor. The ionization chamber 24 is then installed in the dead graphite reflector with the shielded conduit 26 enclosing the wire line 25 extending therefrom to the outside of the structure. The chamber 24 is preferably installed opposite the fifteenth and sixteenth layer of the live graphite on the side opposite the channel 23. The use of the ionization chamber will be described later in greater detail.

The regular construction is then continued further until 24 layers of live graphite have been built up to form the active portion 30 of the reactor.

Figure 6:
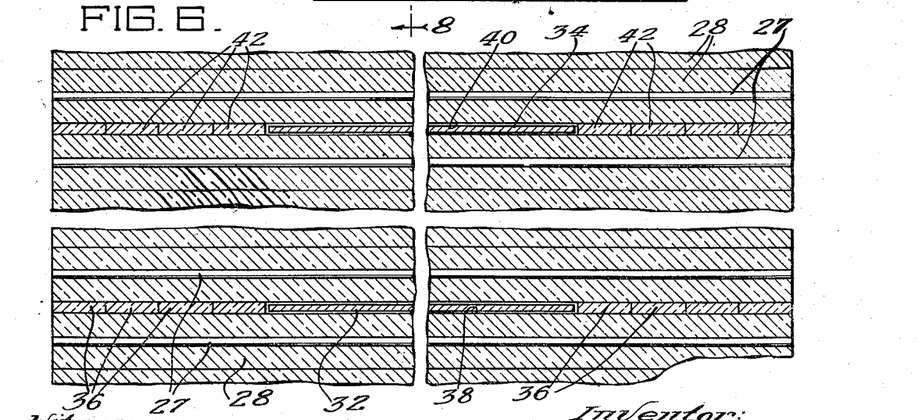
Fig. 6 is an enlarged fragmentary cross-sectional view partially in elevation of a portion of the structure shown in Fig. 5 taken along the line 6—6 thereof showing the positioning of the control plates in the reactor.

During the construction of the active portion 30, the front and rear walls 18 and 20 are built progressively with the assembly of the live and dead graphite to a height corresponding to 21 rows of live graphite whereupon the dead graphite is extended to the outer surface of the end walls to form the projections 17 and 19 of dead graphite. Following the assembly of 24 layers of the live graphite, space is left for the control plate 32 extending substantially two-thirds across the length of the live graphite blocks. As best shown in Fig. 6, the 24th layer of active graphite supports at the ends thereof several blocks 36 of dead graphite about 2 inches in height to form a space 38 for the control plate 32. The layers of graphite subsequently added over the control plate are sufficiently rigid to define the space 38 without material sag of the live graphite blocks into the space 38.

It is exceedingly important that prior to continuing the assembly of the live graphite to form the inactive portion, the control plate 32 be positioned within the space 38 in a fully inserted position over the reactor portion 30 to prevent initiation of the neutronic reaction upon placement of additional live graphite. The presence of the plate 32 in that position substantially prevents migration of neutrons from the upper portion 31, subsequently constructed, into the lower portion 30, thereby maintaining the reproduction ratio of the reactor below unity until normal operation is desired.

Following placement of the blocks 36 of dead graphite and introduction of the control plate 32 within the lateral space 38, between the dead graphite blocks 36, construction of the reactor is continued by laying down additional layers of live graphite. As indicated above, a number of layers are then provided in accordance with the sensitivity of the desired control to form that portion of the reactor between the control plates 32 and 34. In the structure described, 6 layers of live graphite are assembled, whereupon space 40 is left for the control plate 34 in a manner similar to that used to provide the space 38 by use of additional dead graphite blocks 42 resting on the thirtieth layer of live graphite. Control plate 34 is then inserted fully in the space 40 to limit the contribution of neutrons to the active portion 30 upon adding the seven remaining layers of the reactor. The side walls 18 and 20 are continued and the upper portion of the reflector added as dead graphite, the top of the structure being completed by the addition of the concrete bricks 22.

As the layers of active graphite are added over the space 38 enclosing the plate 32 a point is reached at which, without the inserted plate 32, the partially completed reactor would produce a self-sustaining neutronic reaction. Such a point is shown in Fig. 5 as defined by a plane 44. That portion of the reactor below the plane 44 and including the control plate 32 is physically greater than critical size whereas that portion above the plane 44 is less than critical size. The entire reactor may therefore be considered as of two unequal portions each having a control plate extending therein from opposite sides. Consequently, effective critical size at which a self-sustaining reaction is just maintained is reached by withdrawing the control plates in the manner described below.

In the structure just described, control of the reactor is effected by increasing and then decreasing the effective size of the active portion of the reactor from below critical size to slightly above critical size by movement of the control plates 32 and 34 outwardly and then inwardly of the reactor in opposite directions. As later described, the effective area for the absorption of neutrons by the control plates is greater than the mere structural volume occupied by the plates. Consequently, the plates 32 and 34 need not be continuous but may be in the form of parallel rods of circular or other shaped cross-section, supported side by side in planes positioned similarly to the plates 32 and 34, a plurality of such rods replacing each of the plates 32 and 34.

Figure 7:
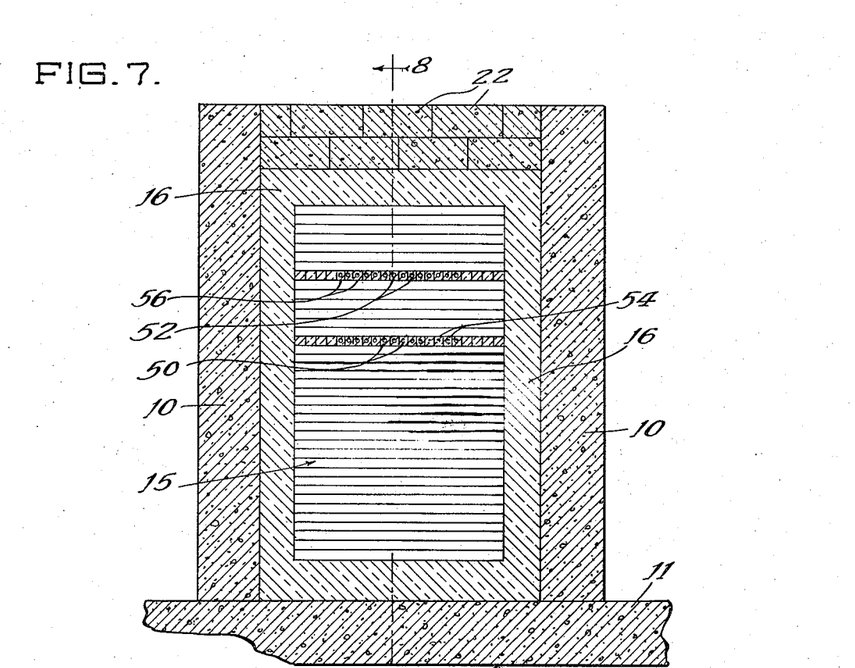
Fig. 7 is an elevation view in cross-section of a modified form of reactor incorporating my invention.
Figure 8:
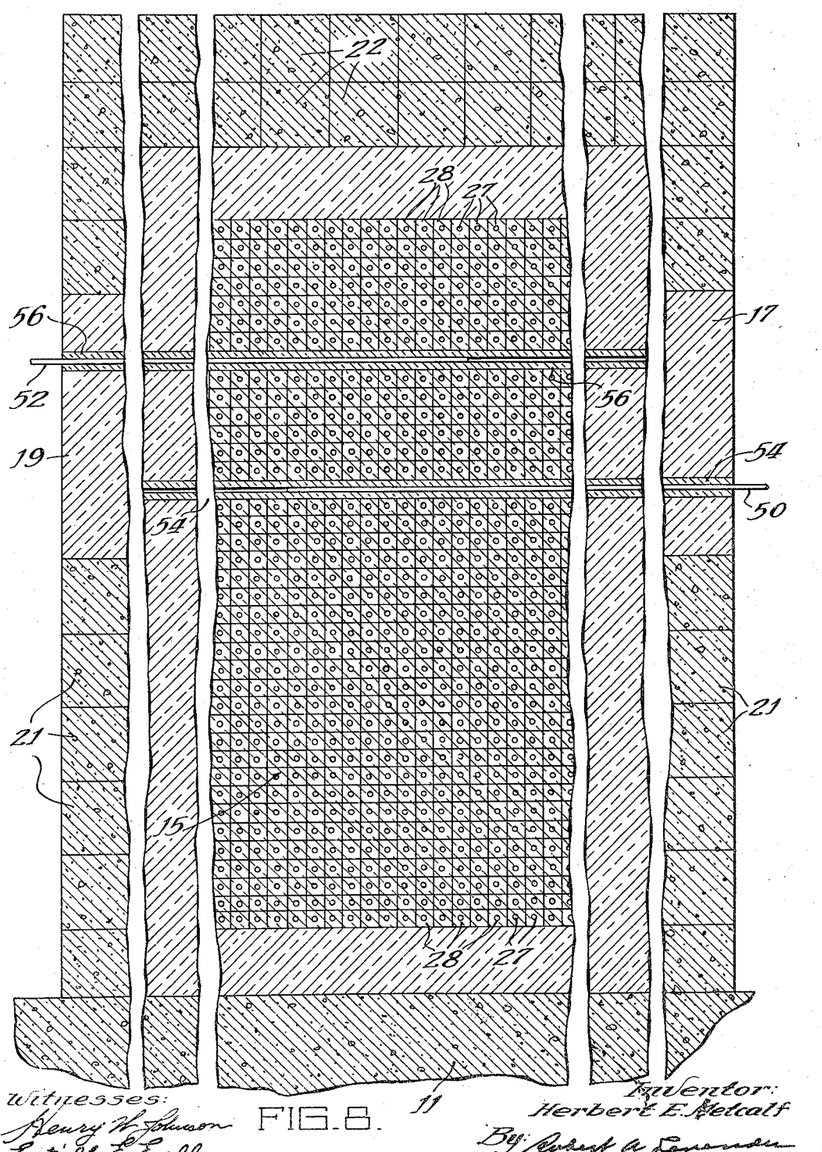
Fig. 8 is an enlarged elevation view of the modified reactor shown in Fig. 7 taken along the line 8—8 thereof.

Referring to Fig. 7, showing a modified form of a structure made in accordance with my invention and wherein parts previously described are similarly referenced, the control plates are each replaced by a plurality of rods 50 and 52, the rods 50 replacing the control plate 32 and the rods 52 replacing the control plate 34 previously described. These rods are likewise of cadmium or other material having high neutron absorption characteristics and are supported within graphite blocks 54 and 56. As best shown in Figs. 7 and 8, the drilled graphite blocks 54 and 56 are preferably positioned transversely of the active graphite blocks 28 which support the uranium rods 27, the remaining portion of the structure being as previously described.

With the structure shown in Figs. 7 and 8, the control rods 50 are tied together and moved as a unit with the control rods 52 similarly tied together and moved in opposite directions as a unit, thereby effectively varying the effective volume of the reactor within limits above and below that corresponding to critical size.

Figure 9:
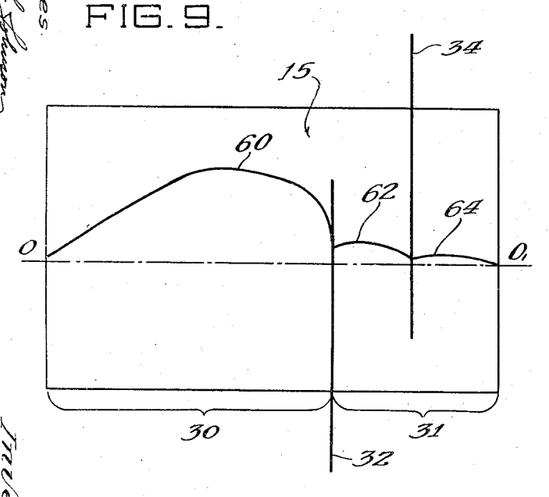
Figs. 9 and 10 are representative curves showing variation of neutron density within a reactor for two different positions of the control plates.

I have plotted as an illustrative curve 60 in Fig. 9, the neutron density as ordinates from and along a central axis $O—O_1$ in the active portion of the reactor. I have also plotted similar curves representative of neutron density in the inactive portion of the reactor, the curve 62 being for the neutron density between the control plates 32 and 34, and the curve 64 being indicative of neutron density for that portion of the reactor above the control plate 34. It will be noted that the neutron density, as represented by these curves, decreases gradually from the approximate center of the respective portions of the reactor for which the curves are drawn and decreases rapidly adjacent the control plates 32 and 34. Thus, it will be noted that the neutron density immediately adjacent the control plates 32 and 34 decreases rapidly to a value that is small in comparison with the maximum neutron densities adjacent the center of the respective reactor portions. This action, previously mentioned, is a natural function of the neutronic reaction and is due to the fact that neutrons absorbed by the control plates are ineffective in producing additional neutrons by fission, whereas in the absence of the plates, these neutrons would produce fission and a consequent increase in neutron density. The control plates are therefore effective over a greater volume of the reactor than actually occupied by the plates. It is for this reason that adjacent control rods, such as shown in Figs. 7 and 8, may be used in place of each of the control plates previously described.

The curves 60, 62, and 64 shown in Fig. 9 are representative of one condition of operation for a given positioning of the control plates 32 and 34. For the conditions assumed, and the overlapping positioning of the control plates as shown, the neutron contribution of the portion above plate 32 but not cut off from the active portion 30 by the plate 32 to the active portion 30 of the reactor is sufficient to maintain a self-sustaining neutronic reaction in the reactor. Thus the volume of the reactor effective in maintaining the reaction is equal to or greater than that corresponding to critical size. If this effective volume is greater than critical size, the neutronic reaction will increase exponentially with time and it is necessary to prevent such an exponential rise by additional overlapping, or by so moving the control plates 32 and 34 in unison that a smaller portion of the inactive portion 31 of the reactor is effective in supplying neutrons to the active portion 30. This latter method is preferred when only small ranges in reproduction ratio are desired for operating control purposes.

Let is be assumed that it is desired to increase the neutron density within the reactor over the condition shown in Fig. 9. The reaction may be increased in density by moving the control plate simultaneously to the right so that the control plate 32 is slightly withdrawn from the reactor and the control plate 34 is inserted into the reactor by an equivalent amount. This motion increases the neutron contribution to the active portion 30 from the portion between plates 32 and 34. Such motion of the control plates provides a fine degree of control although for rough adjustment the control plates may be moved in opposite directions as referred to later.

Figure 10:
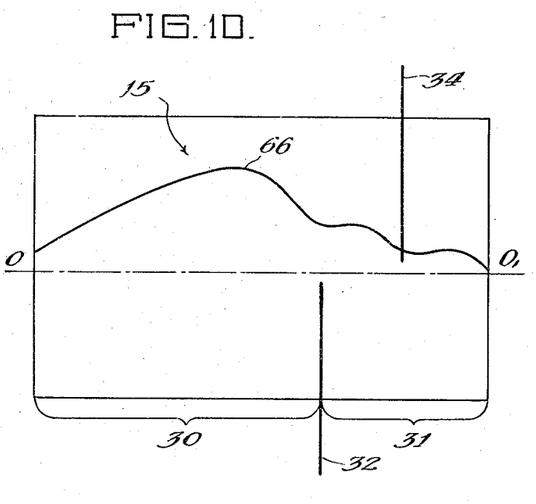

The rapidity of response of the reactor with any given outward movement of the control plates is a function of the generation of neutrons. Certain of the neutrons are delayed in emission following capture of a thermal neutron by the $U^{235}$ nucleus. It is very important that the control plates be moved out slowly as the effective critical size of the reactor is approached and exceeded, so that they may be reinserted before exceeding the permissible neutron density. For comparison purposes, however, Fig. 10 is a curve illustrative of neutron density for non-overlapping positioning of the control plates 32 and 34. It would be exceedingly dangerous to withdraw both plates to the extent shown in Fig. 10 if a neutronic self-sustaining reaction occurred with the plates as shown in Fig. 9 and this example is given merely for illustrative purposes.

Referring to Fig. 10, the plates 32 and 34 are shown withdrawn to such an extent that there is direct contribution of neutrons from the inactive portion to the active portion along the axis of the reactor. It should be noted that the curve decreases somewhat in the region beyond the end of the control plate 32 due to absorption thereby of those neutrons that would otherwise produce fission and a consequent increase in density over this region. Similarly, the curve 66 shows an increase in neutron density between the control plates 32 and 34 due to fission in this region and a second decrease adjacent the control plate 34, increasing slightly in the volume of the reactor above the control plate 34. The adjustment of the control plates as shown in Fig. 10 will be more critical. Thus, a given outward movement of the control plates will produce a greater increase in neutron density for the position shown in Fig. 10 than for that in Fig. 9, because for such given movement a greater number of neutrons are effective in contributing to the neutronic reaction.

The curves shown in Figs. 9 and 10 are representative of neutron density along the axis O—$O_1$ as previously indicated. The neutron density along an axis transverse to the axis O—$O_1$ will likewise decrease from the center toward the sides of the reactor. Consequently, a given movement of the control plates will be more effective in reaching or exceeding critical size conditions when the overlap of these plates is centered about the axis O—$O_1$ than when this overlap is adjacent one or the other edge of the reactor.

As indicated above, it is not yet accurately known to what degree the reproduction factor will increase or decrease with prolonged use of the reactor. The weight of experimental evidence seems to indicate a variation in the reproduction factor wherein an initial decrease in the factor is followed by an increase that is in turn followed by a second decrease. In the initial stages of reactor operation it is expected that the formation of radioactive fission products having large neutron capture characteristics may occur at a greater rate than the formation of plutonium. This would produce a reduction in the reproduction factor. However, measurements made on such radioactive fission products indicate that they are converted by radioactive decay processes or by neutron absorption to elements or isotopes having smaller neutron capture characteristics. Consequently, the effect of the fission products in increasing neutron absorption will tend to become stabilized and an equilibrium reached between formation and transmutation. However, the formation of plutonium continues with reactor operation and it is expected that the increase of fissionable material by the formation of plutonium will cause an increase in the reproduction factor after the initial stages of operation, thereby overcoming the initial loss due to neutron absorption by the formed fission products. However, in the later stages of operation the exhaustion of $U^{235}$ by fission thereof may not be compensated fully by the formation of plutonium, the plutonium is used up by fission, and the reproduction factor may again decrease. It is therefore desirable to provide a reactor in which compensation for this variation in the reproduction factor may be made. Thus in the initial states of operation during which the reproduction factor may decrease the control plates may be moved outwardly of the reactor such as to add to the effective size, followed by an inward movement decreasing the effective size and subsequent outward movement to overcome deficiency in the fissionable material of the reactor. This effect will be very slow, however, and unless pronounced changes are encountered, movement of the control plates together in the same direction may be sufficient. However, for greater changes in the reproduction factor, a shift in the overlapping relationship of the plates may be necessary.

As indicated above, any increase in neutron density after effective critical size of the reactor is reached, such as by initial adjustment of the control plates, will be effective in producing an exponential rise in the rate of neutronic reaction. Such a rise must be terminated to maintain the neutronic reaction within the heat dissipating capacity of the reactor and its surrounding reflector and concrete shield. Thus, following initiation of a self-sustaining neutronic reaction, the reaction may be stabilized about an average neutron density value within the heat dissipating capacity of the system by increasing the relative overlapping condition of the control plates or by moving the control plates as a unit so that the overlap thereof is in a lower density region of the reactor until the condition of less than unity reproduction ratio is obtained and the neutron density decays to the newly desired lower level. Following attainment of this desired density, the control plates may be moved to a slightly higher neutron density position to raise the reproduction ratio above unity at which the neutronic reaction tends to increase, whereupon the separation or position of the control plates may be varied above and below that corresponding to critical size with a reproduction ratio of unity.

It should be appreciated that the action of the control plates in limiting and controlling the neutronic reaction is not due to variation in neutron absorption with variation in position of the plates for a given power. Thus, after normal operation is initiated and for the finest degree of control, the plates are moved simultaneously and in the same direction, so that a decrease in volume of one plate within the reactor is compensated by an increase in volume of the other plate inside the reactor. While the neutron absorption by each plate individually varies somewhat in accordance with the volume thereof within the reactor, the total neutron absorption by both plates or by the two sets of control rods is substantially constant for different positions thereof, and almost exactly constant for the small distances the plates move to exert normal control.

The materials of which the control plates are made, such as cadmium, have a larger neutron absorbing action for slow neutrons than for fast neutrons. Some few fast neutrons, incident on the control plates from the active portion 30 of the reactor may penetrate the plates and produce fission by being slowed to thermal energy by the graphite in the inactive portion of the reactor. The proportion of penetrating neutrons with respect to absorbed neutrons is relatively small however, and the number of the neutrons produced through fission by the penetrating neutrons which repenetrate the control plates and return to the active portion of the reactor is still smaller. Consequently, the control plates act as barriers limiting the effective critical size of the reactor developing the neutronic reaction. In addition to the above-mentioned effect, the action of the control plates is effective in decreasing the probability of fission immediately adjacent the surfaces of the control plates. Such action may be termed a neutron sink action that reduces the number of neutrons having sufficient energy to penetrate the control plate, thereby reducing fission in each portion of the reactor by neutrons previously produced in the other portion.

Figure 11:
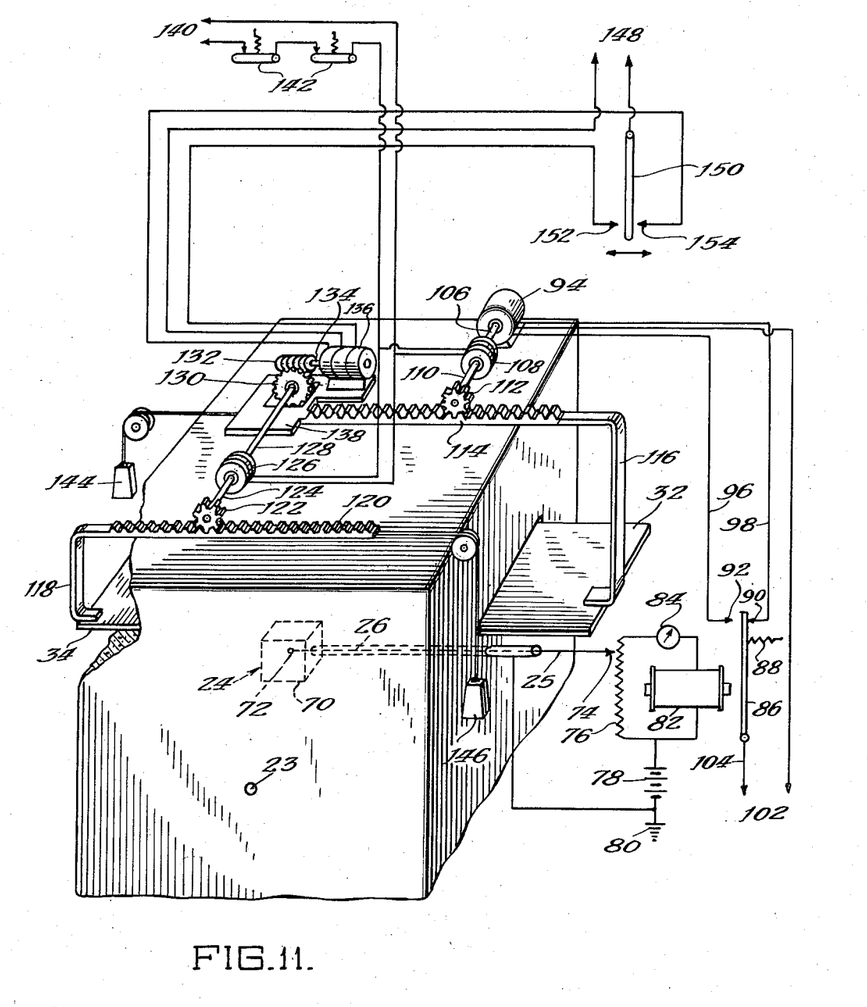
Fig. 11 is a schematic wiring diagram showing a circuit for controlling a neutronic reactor in accordance with my invention.

The reaction may be controlled by manual movement of the control plates although movement of the control plates in accordance with the neutron density within the reactor may be desired. Reference is made to Fig. 11 that shows diagrammatically one form of automatic control and safety circuit that may be used for regulating the neutron density within the reactor. The ionization chamber 24 previously described as embedded in the reflector 16 closely adjacent the reactor 15, comprises a sealed metal casing 70 containing approximately 18 liters of boron fluoride at one atmosphere pressure into which projects a central electrode 72. The central electrode 72 is connected through the shield conduit 26 by wire line 25 to an adjustable contact 74 on a resistor 76. One end of resistor 76 is connected through a battery 78 of about 450 volts potential to the shield conduit 26 and ground 80. This end of the resistor is likewise connected to a relay coil 82, the opposite side of which is connected through an indicating meter 84 to the other end of resistor 76. Neutron absorption by the boron in the ionization chamber 24 causes alpha ray ionization in the chamber, the intensity of ionization being indicated by the meter 84 and determining the magnetic flux developed by the relay coil 82. The meter deflection and developed flux is only approximately linear with neutron density but is reproducible and readily calibrated in terms of neutron density.

The relay coil 82 operates a relay armature 86 that is spring biased by spring 88 to engage one motor control contact 90, and is urged by current in relay coil 82, against the tension of spring 88, to engage a second motor control contact 92. Contacts 90 and 92 connect to a split winding of a reversible motor 94, mounted in a fixed position, through lines 96 and 98, the center connection of motor 94 being connected through line 100 to power mains 102 and thence through the power source (not shown) to the armature 86 through line 104. The motor 94 is connected through shafting 106, magnetic clutch 108 and shafting 110 to a pinion 112. The pinion 112 engages a toothed rack 114 having a U-shaped portion 116 attached, or otherwise affixed, to the control plate 32. The control plate 34 is likewise provided with a U-shaped member 118 terminating in a rack 120 engaging a pinion 122. The pinion 122 engaging rack 120 is connected through shaft 124, magnetic clutch 126, shaft 128, gear 130, worm 132 and shaft 134 to a motor 136 mounted on a platform 138 attached to the rack 114.

Each of the magnetic clutches is connected in parallel and to a power line 140 through emergency break switches 142. Upon opening one or more of the break switches 142, the magnetic clutches are de-energized, allowing the control plates to be drawn inwardly by weights 144 and 146 attached to the racks 114 and 120, respectively. Such a safety measure is very desirable in the event of power failure that might leave the control plates in such a position that the neutron density would continue to rise indefinitely.

The motor 136 is capable of being energized from power line 148 through a switch lever 150 thrown manually into engagement with either motor contact 152 or 154 depending upon the desired direction of rotation as hereinafter appears.

It will be apparent that the motor 94 being mounted in a fixed position is capable of moving the rack 114 to the right or left together with the platform 138 on which the motor 136 is positioned. The pinion 122 being driven through worm 132 remains stationary so that when the motor 136 is unenergized the rack 120 moves with the rack 114. Thus, as the control plate 32 is moved inwardly or outwardly of the reactor, the control plate 34 is moved outwardly and inwardly, respectively, to the same extent.

Having described a circuit for controlling the position of the control plates in the reactor, I will now describe its operation, considering the condition obtaining when the plates are fully inserted within the reactor such as following construction of the reactor as previously described.

Since the active portion 30 of the reactor below the control plate 32 is constructed to be less than critical size and the inactive portion 31 is ineffective in materially adding neutrons because of the fully inserted control plates 32 and 34, which might make the inactive portion effectively larger than critical size, no reaction will be initiated for this positioning of the control plates. To initiate the reaction, I prefer to initially adjust one of the control plates such as by movement of the plate 34 outwardly of the reactor. The motor 94 is provided with a clutch mechanism (not shown) rigidly locking the shaft 106 to the frame of the motor 94 when this motor is unenergized. Consequently, for this condition the rack 114 is held stationary by the pinion 112. To make the initial adjustment of the plates, I therefore energize the motor 136 by connecting the power line 148 through the switch lever 150 with the motor control contact 152 to drive the motor 136 in such a direction that the pinion 122 is rotated in a clockwise direction to move the plate 34 in an outward direction from its fully inserted position in the reactor.

While the plate 32 is in its original position, fully inserted within the reactor, such motion of the plate 34 increases the neutron density above the plate 32 and since the width of the plate is only about two-thirds the reactor width, a portion of these neutrons is effective in increasing the neutron density in the reactor portion 30. Such increase in neutron density causes a rise in ionization within the ionization chamber 24. For this initial adjustment of the control plate 34, the contact 74 is raised to the uppermost position on the resistor 76 so that for a small increase in ionization in the ionization chamber a maximum deflection is produced on the meter 84. The outward movement of the control plate 34 is then continued by rotation of the pinion 122 in a clockwise direction until the meter 84 indicates a non-linear or exponential increase in neutron density. Immediately upon such indication the motor 136 is reversed by moving the switch lever 150 into engagement with the motor control contact 154 to reverse the motion of the control plate 34 and to decrease the neutron density within the reactor. The non-linear rise in neutron density is indicative of a self-sustaining neutronic reaction therein, and such a reaction should not be maintained until final adjustment of the circuit including the ionization chamber is made. The movement of the control plate 34 inwardly is continued until the non-linear rise in neutron density is overcome.

In the absence of a self-sustaining neutronic reaction within the reactor, the armature 86 is normally in contact with the motor control contact 92. The sliding contact 74 on the resistor 76 is then adjusted to provide sufficient attraction of the armature 86 by the relay coil 82 upon reinitiation of the neutronic reaction to a density somewhat less than that previously obtained by outward movement of the control plate 34. Power mains 102 are then energized to drive the motor 94 in a counterclockwise direction to move the plate 32 in an outwardly direction. Since the platform 138 carrying motor 136 is mounted rigidly with the rack 114 and the worm 132 prevents rotation of the pinion 122, movement of the rack 114 will produce corresponding movement of the rack 120 and consequent inward motion of the control plate 34. It will thus be apparent that as the plate 32 is moved outwardly, the plate 34 is moved inwardly. However, notwithstanding substantially uniform neutron absorption by the control plates under such movement, the control plate 32 being in a lower region of the reactor will tend to increase the effective size of the reactor at a greater rate than the plate 34 produces an effective decrease in size, and with outward movement of the plate 32 and equal inward movement of the plate 34, a position is reached at which the neutron density within the reactor increases exponentially. The previously adjusted ionization chamber circuit will then provide sufficient current to the relay coil 82 to draw the armature 86 into engagement with the motor control contact 90, thereby reversing the motor 94, with consequent reversal of the motion of the control plates 32 and 34, to decrease the neutron density within the reactor. The control plates will then continue to hunt between positions on either side of a condition corresponding to the critical size of the reactor causing first an increase and then a decrease in neutron density within the reactor. Any well-known anti-hunting device may be used, as well known in the art, to limit the hunting action of the control plates. The temperature variation within the reactor will lag slightly the variation in high neutron densities therein, so that this hunting action is not detrimental if limited within relatively narrow limits as hereinafter appears. Thus, the time during which the reactor has an effective size greater than critical size is definitely limited by the heat dissipating capacity of the reactor and its surrounding reflector and shield.

It is clear from the foregoing that my invention contemplates the potential utilization of the entire active portion of the neutronic reactor. With decrease in K in operation of the reactor, the plates 32 and 34 are moved simultaneously to the right (Fig. 5) until the whole volume between plates 32 and 34 becomes part of the active portion of the reactor. The volume above the plate 34 remains substantially inactive during this time. Then when additional K is required, and as it is demanded, the plates 32 and 34 are moved apart to utilize the uranium above the plate 34. Assuming that K continues to fall, ultimately the plates 32 and 34 will be spaced apart the width of the active portion and the full amount of uranium originally provided will be active.

It should be distinctly understood that the control by movement of the control plates cannot be likened to a throttle control. The rate at which the reaction occurs is not dependent upon the volume of the reactor effective in supplying neutrons to the reaction, but rather upon the neutron density attained after exceeding an effective volume corresponding to critical size and before decrease to this size. For example, upon increasing the volume beyond that corresponding to effective critical size by moving the control plates, the neutron density will continue to increase exponentially with time. Control is therefore effected by varying the total volume of the reactor effective in developing the neutronic reaction by movement of the control plates.

An important element in the control of the reactor is the fact that not all of the fast neutrons originating in the fission process are emitted immediately. About one percent of the fast neutrons are "delayed neutrons." These delayed fast neutrons appear from .01 second to several minutes after the fission has occurred. Half of these neutrons are emitted within six seconds and .9 within 45 seconds. The mean time of delayed emission is about 5 seconds. The cycle of neutron emission, migration through the moderator, slowing to thermal energy, and fission capture is completed by 99 percent of the neutrons in about .0015 second, but if the reactor is near the balanced condition the extra 1 percent may make all the difference between an increase or a decrease in the neutronic activity. The fact that the last neutron in the cycle is held back, as it were, imparts a slowness of response to the reactor that would not be present if the neutrons were all emitted instantaneously.

For cases in which the reproduction ratio R differs from unity by less than 1 percent, the ratio of rise is given by $$n = n_0 e^{wt}$$

where $$w = \frac{R-1}{\alpha - (R-1)} \cdot \frac{1}{T}$$

In this formula $\alpha$ is the fraction of the neutrons that are delayed, $\alpha = .01$, T is the mean lifetime of the delayed neutrons $= 5$ second.

As an example, assume R becomes 1.001 as a result of increasing the active volume of the reactor by moving the plate 32 outwardly and the plate 34 inwardly of the reactor. Then $$w = \frac{.001}{.01 - .001} \cdot \frac{1}{5} = \frac{1}{45}$$

that is, $n/n_0 = 2.72$ in 45 seconds. This doubling occurs about every 30 seconds and continues indefinitely.

If R were made exactly 1.01, a more detailed theory shows that the neutron density would be tripled each second. However, if the reproduction ratio R is suddenly increased several percent, so that the one percent delayed neutrons are unimportant as compared with $R-1$, the neutron density increases at a much more rapid rate as given approximately by $R^t/l$ where $l$ is .0015 second, the normal time to complete a cycle. Thus, if R were to be made 1.04, the neutron density would increase in 1.5 seconds by a factor of approximately $10^{17}$ over its original level. However, if R were 1.02 or 1.03, the factor by which the neutron density would be multiplied each second would be 1100 and 700,000, respectively. It is thus apparent that too high a reproduction ratio in a practical system leads to the necessity of providing safety measures which positively limit all danger of exceeding a permissible rate of neutron density increase. An exceedingly dangerous condition could exist if by accident the effective volume of the reactor were suddenly increased considerably beyond that corresponding to critical size as the time required for inserting the control plates might be too long to prevent destruction of the system. As the same eventual neutron density can be obtained with a reproduction ratio only slightly over unity as with a higher ratio, only at a slower rate, the lower reproduction ratios are preferred in practice in the interest of safety.

From the foregoing description of a structure embodying my invention and my method of controlling a neutronic reaction, it will be apparent that the reactor may be built to a physical size exceeding critical size to allow for any decrease in the reproduction factor of the reactor during continued operation thereof. During the operation of a neutronic reactor particularly at high neutron densities radioactive elements of exceedingly high capture cross section may be formed in the uranium as an intermediate element in the decay chains of fission fragments and this formation will lower the value of the reproduction factor for the system. Radioactive xenon 135 is an example of such an intermediate element, this product having a half life of about 9 hours and being formed mostly from radioactive iodine which has a half life of about 6.6 hours and decays to barium. My invention provides reserve reproduction factor to compensate for such poisoning. Notwithstanding the larger than critical size construction, the volume of the reactor effective in developing the reaction may be limited by separating the reactor into unequal parts by neutron absorbing members without danger of exceeding the heat dissipating capacity of the reactor and without danger of providing a high reproduction ratio that might cause such a rapid rise in neutron density as to be uncontrollable. Simultaneous movement of the control plates in the same direction provides mutually opposing effects so that a small movement of one plate is counterbalanced by the movement of the other plate. Accordingly, the increase or decrease from critical size conditions is retarded with such movement of the control plates, and the control is thus made more flexible.

In addition to safety features comprising the magnetic clutches, that when released allow the control plates to be drawn into the reactor, other steps may be taken to prevent an abnormal rise in neutron density within the reactor. Which I have not shown such auxiliary safety devices in the drawings, temperature responsive controls may be used to interrupt the magnetic clutch circuits to draw the plates within the reactor. Auxiliary ionization chambers may be installed adjacent the reactor to similarly draw the plates inwardly under high excess neutron densities. Furthermore, the use of the described uranium metal rods or fissionable material is not necessary. The uranium may be in the form of oxide either as rods, spheres, or other shaped objects distributed in the graphite or other moderator, such as beryllium. The uranium may also be enriched by other fissionable materials such as by $94^{239}$ incorporated therewith.

Corresponding to a maximum value of the reproduction factor of $K=1.092$ for pure natural uranium metal rods in pure graphite, the following maximum values of K for other pure materials and shapes is given here for illustrative purposes:

| Natural U | rods in graphite | $K=1.092$ |
| Natural $UO_2$ | rods in graphite | $K=1.058$ |
| Natural $U_3O_8$ | rods in graphite | $K=1.047$ |
| Natural U | spheres in graphite | $K=1.10$ |
| Natural $UO_2$ | spheres in graphite | $K=1.066$ |
| Natural $U_3O_8$ | spheres in graphite | $K=1.055$ |

The reactor may be utilized as a heat energy source and as a high intensity source for neutrons and gamma rays. While I have not shown any cooling means other than cooling by natural radiation from the structure, the heat may be removed by a circulating fluid such as water carried in conduits embedded in the reactor, in the neutron reflector or in the shield. The channel 23 extending to the center of the reactor allows escape from the reactor of a collimated beam of fast neutrons and gamma rays. The neutrons may be used for determining characteristics of materials under fast or slow neutron bombardment and the gamma rays for taking X-ray photographs of heavy castings or similar equipment where very penetrating rays of high density are required. In addition, the channel 23 may be packed with any material desired and the scattering effect of the material or its neutron absorption characteristics determined, for example. Further isotopes of or transmutations to, various elements may be produced in large quantities by packing these elements into the channel 23 and exposing them to the action of the neutrons developed in the reactor. As an example of isotope production, followed by transmutation, $U^{233}$ may be produced from $Th^{232}$ in the channel 23 in accordance with the product of slow neutron density in the channel and time of exposure. Thorium 233 then decays to form protoactinium 233 and thence to uranium 233 which is valuable as a fissionable material similar in its action to $U^{235}$ and $94^{239}$.

My neutronic reactor and method of control is of particular advantage in irradiating, within the channel 23, materials highly absorbent to neutrons such as samarium and gadolinium. As indicated above, even small quantities of such materials may stop the neutronic reaction in the reactors proposed heretofore, whereas in my reactor the reproduction ratio may temporarily be increased greatly to allow for added neutron loss by partially withdrawing the plates providing a smaller mutual overlap thereof or by moving the plates as a unit with consequent greater contribution of the inactive portion of the reactor to the active portion. Upon removal of the irradiated materials from the channel 23, the control plates may be reinserted or moved to their original position. Thus, adequate control is provided before, during, and subsequent to insertion of highly neutron absorbent materials within the channel 23.

In addition to the usual industrial hazards during the operation of the apparatus described, operating personnel must be protected from injury by gamma rays and neutrons generated in the reactor. This is the major purpose of the 5 foot thickness concrete shield surrounding the reactor and reflector. Inasmuch as the concrete contains water of crystallization and may contain water retaining materials, and is relatively dense, it serves as an effective shield for neutrons as well as gamma rays. Sufficient shielding should be provided to reduce the radiation from the structure to at least 0.10 roentgen per 8 hour day per person at the closest point of approach. This exposure is considered to be the maximum safe radiation permissible to which an individual may be subjected over the whole body.

While the theory of the nuclear chain fission mechanism in uranium set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

I claim:

1. In a neutronic reactor having an active portion comprising a thermal neutron fissionable material and having a neutron reproduction ratio at least equal to unity, the improved control apparatus comprising a plurality of absorber members extending into the active portion at different distances from the center thereof, and motive means coupled in common to said absorber members in a manner to simultaneously withdraw at least one of said absorber members and to insert at least one other of said absorber members to effect fine control of the neutron reproduction ratio.

2. The apparatus of claim 1 wherein the total amount of absorber material present in the reactor remains constant with energization of said motive means.

3. A method of controlling the neutron reproduction ratio of a neutronic reactor comprising simultaneously withdrawing and inserting respective neutron absorber members at respectively different distances from the center of the reactor.

4. The method of claim 3 wherein the total quantity of absorber present in the reactor is maintained constant.

References Cited in the file of this patent

UNITED STATES PATENTS

| 2,127,193 | Toulmin | Aug. 16, 1938 |
| 2,206,634 | Fermi et al. | July 2, 1940 |

FOREIGN PATENTS

| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Kelly et al.: Physical Review 73, 1135–9 (1948).